R. B. BOSTWICK.
FILLER FOR TIRES.
APPLICATION FILED MAR. 11, 1916.
1,232,887.
Patented July 10, 1917.
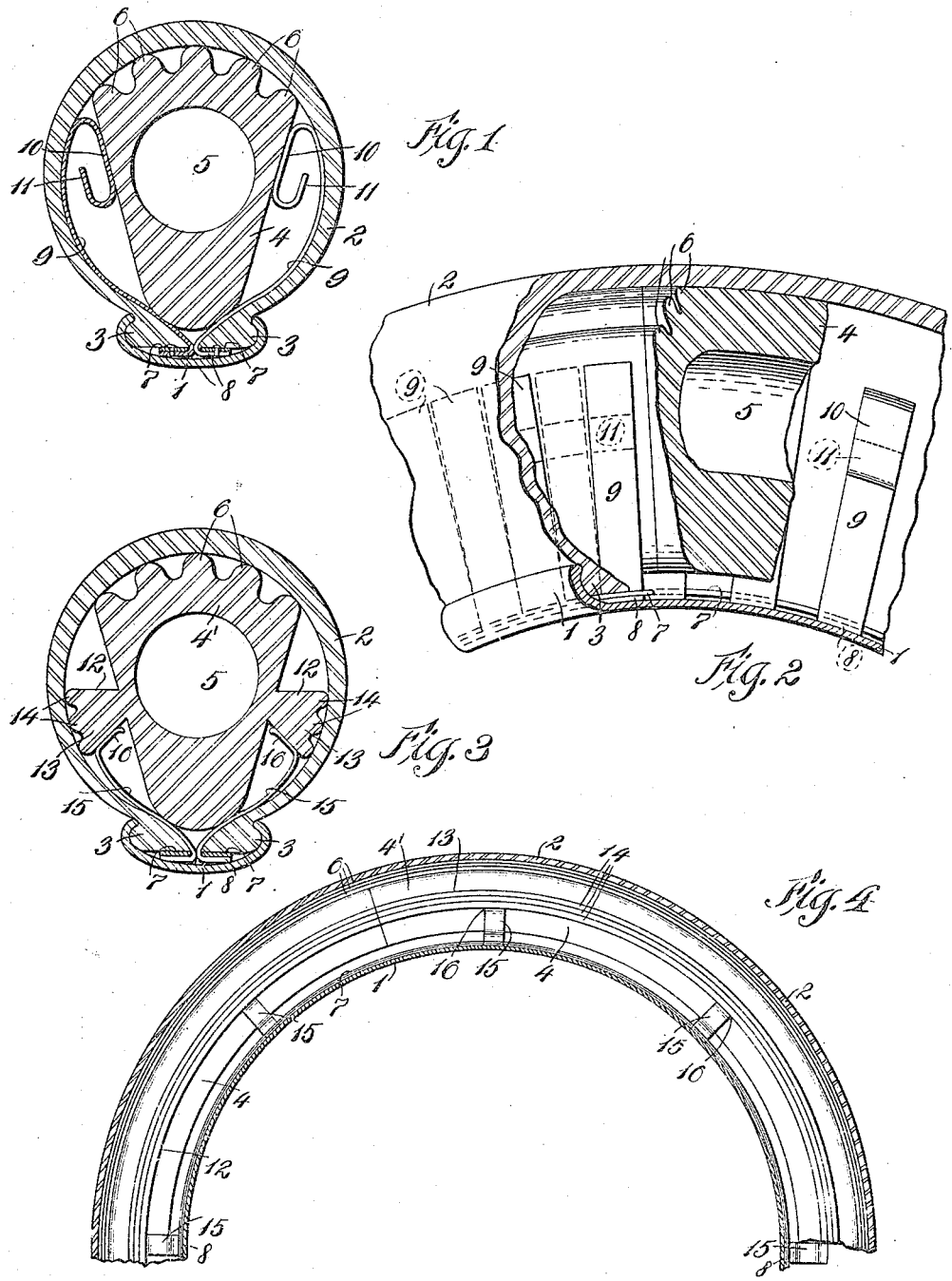

UNITED STATES PATENT OFFICE.

ROLLA B. BOSTWICK, OF CLEVELAND, OHIO.

FILLER FOR TIRES.

1,232,887.  Specification of Letters Patent.  Patented July 10, 1917.

Application filed March 11, 1916. Serial No. 83,467.

*To all whom it may concern:*

Be it known that I, ROLLA B. BOSTWICK, a citizen of the United States, residing at Cleveland, in the county of Cuyahoga and State of Ohio, have invented a certain new and useful Improvement in a Filler for Tires, of which the following is a full, clear, and exact description, reference being had to the accompanying drawings.

This invention relates to vehicle tires, and more particularly to tires wherein one or more resilient filling members are employed in place of the ordinary pneumatic inner tube for the purpose of rendering the tire immune from troubles incidental to puncture and at the same time to secure in such tires a resiliency and capability of operation substantially the same as that secured in and through the use of such pneumatic inner tubes. A further purpose of the invention is to secure this result in and through a construction and arrangement of filling or core members which will make it adaptable for use with practically any standard type of shoe or outer casing; also to provide a construction which can be conveniently applied to and removed from the outer tubes or casings. Further objects of the invention will appear hereinafter and will be realized in and through the combination of elements embodied in the claims hereto annexed.

In the drawings forming part hereof, Figure 1 represents a transverse sectional view through a tire embodying my invention showing a standard type of rim; Fig. 2 a detail in elevation, with parts broken away, of the tire and rim of the preceding figure; Fig. 3 a view similar to Fig. 1 of a modified form of my invention; and Fig. 4 is a view showing the rim and shoe in section and the core or filler in elevation.

Describing by reference characters the various parts illustrated herein, 1 denotes a rim of ordinary construction, such as the rim known to the trade as the "clencher" rim. 2 denotes the outer shoe or casing, the same being of any ordinary construction and having the beads 3 which are adapted to be engaged by the curved flanges of the rim. 4 denotes a core of resilient material—preferably rubber—which is of sufficient depth to bear at its inner edge against the beads 3 at the base of the shoe and thereby tend to hold them in their distended positions and bears at its outer face or edge against the inner surface of the tread portion of the shoe. It will be observed that this filler is of somewhat wedge shape, whereby a sufficiently extended bearing will be provided between its outer surface and the shoe to form a yielding brace or support for the tread portion of the shoe which presses against the core. For the purpose of increasing the resiliency of the core 4, it may be provided with a longitudinally extending bore 5 and the outer side or surface may be corrugated, as shown at 6. The core 4 may be made as a continuous piece extending entirely around the interior of the shoe, or it may be made of several sections, as desirable.

For the purpose of properly centering the core within the shoe and for the purpose of receiving and cushioning any side thrusts that may be imposed upon the tire, as by striking a curb, I provide on each side of the core a series of flat springs. These springs are carried by flat metal bands 7, which are adapted to bear against and to be secured to the inner faces of the beads 3. Each spring comprises a flat portion 8 which overlaps and is secured to the inner face of its band, the spring then being bent backwardly upon itself, as shown at 9, whereby it conforms to the inner surface of the shoe and holds the same in the position which it would assume if equipped with an inflated inner tube. The spring extends outwardly to a point near the junction of the core with the outer shoe or casing and is there bent into engagement with the core, providing an elongated bearing thereagainst, as shown at 10, the end of the spring being bent inwardly between the core engaging portion 10 and the shoe engaging portion 9, as indicated at 11.

In the form of my invention shown in Figs. 1 and 2, the lateral springs are spaced apart substantially the width of a spring and are so arranged that the springs on one side of the core will be staggered with respect to those on the other, as will appear from Fig. 2. This construction provides a tire having practically all of the resiliency of a pneumatic tire but which is immune from the troubles and annoyances resulting from puncture.

In Figs. 3 and 4 there is shown a modification of my invention wherein, instead of using the series of lateral springs 9 to position the core 4', this positioning is done by means of lateral resilient braces projecting from the core and held in place by a comparatively small number of springs. The flat springs 9 in the preceding views are replaced by a small number of positioning springs and two lateral resilient braces 12, which are generally wedge spaced and which are formed with the core, each having a widened edge 13 adapted to bear against the side of the casing, such widened edge being preferably provided with corrugations 14, whereby an efficient cushioning of side blows will be secured. In some instances the springs may be dispensed with. The resilient braces may also be made in spaced sections instead of being continuous.

For the purpose of centering the core, I employ bands 7 similar to those shown in Figs. 1 and 2, and each band is provided with springs 15 which are secured thereto in the same manner as the springs 9, which extend between the inner periphery of the filler 4' and the beads 3 and are provided each with a foot 16 which is adapted to bear against the flattened face of the adjacent lateral member 12, thereby to center the core 4'.

In both forms of my invention, I employ a filling member extending across the shoe from the inner to the outer surface thereof but not filling the entire space inclosed by the shoe, the distention of the shoe being secured by members which engage the sides of the core and the shoe and which serve to keep the shoe in such distended condition, to absorb the side blows to which the shoe may be subjected, and to properly position the core so that it may function in the manner of a pneumatic tire for the purpose of yieldingly backing or supporting the tread portion of the shoe.

While I have necessarily shown both forms of my invention in detail, it will be obvious that such details may be varied more or less without departing from the spirit of my invention; hence I do not propose to be limited to such details except as such limitation may be included in the claims hereto annexed or may be rendered necessary by the state of the prior art.

Having thus described my invention, what I claim is:—

1. In a tire, the combination of an outer shoe, a core within the shoe and having its outer edge engaging the inner surface of the tread portion of the shoe and its inner edge operatively engaging the inner surface or base of the shoe, the sides of the core being beveled, and a series of resilient members on each side of the core and engaging the sides of the shoe and the opposite inclined surfaces of the core.

2. In a tire, the combination of an outer shoe, a core within the shoe, said core being substantially wedge-shaped in cross section and having its outer edge engaging the inner surface of the tread portion of the shoe while its inner edge engages the base portion of the shoe, and a series of metal springs interposed between each side of the core and the shoe and bearing against the sides of the shoe and the opposed beveled faces of the core and serving to maintain the core in operative relation to the shoe and to cushion blows upon the sides of the shoe.

3. In a tire, the combination of a longitudinally divided shoe the base whereof is provided with a pair of beads, a core within the shoe, the outer edge of the core being widened to engage the inner tread portion of the shoe and the inner edge of the core being reduced in width, a band secured to the base of each bead, and springs secured to said bands and extending into the space between each side of the core and the shoe, each spring having a portion engaging the side of the shoe and a portion engaging the opposed side of the core.

4. In a tire, the combination of a longitudinally divided shoe, a core within the shoe, the outer edge of the core engaging the inner tread portion of the shoe and the inner edge of the core engaging the base of the shoe, a band secured to the base of the shoe on each side of the slot therein, and springs secured to said bands and extending into the space between each side of the core and the shoe, each spring having a portion engaging the side of the shoe and a portion engaging the opposed side of the core.

5. In a tire, the combination of a shoe having a tread and a base, the base being provided with beads, a resilient core which is substantially wedge shaped in cross section having its outer edge engaging the inner tread portion of the shoe and its inner edge operatively engaging the base of the shoe, a band secured to the base of each bead and a series of springs secured to each band and extending therefrom along the inner surface of the shoe between the same and the core and each having a portion engaging the opposed lateral face of the core whereby the core is positioned and the blows against the sides thereof are cushioned.

6. In a tire, the combination of a shoe having a tread portion and a pair of basal beads, a metal band secured to the base of each bead, a core within the shoe, said core being substantially wedge shaped in cross section and having its outer edge engaging the tread portion of the shoe and its narrowed inner edge operatively engaging the opposed bead portions of the shoe, and a series of springs secured to each band and extending along the inside of the shoe on opposite sides of the core, each spring being bent inwardly at its outer end to form an elongated bearing against the opposed inclined face of the core, the springs on one side of the core being staggered with respect to those on the opposite side.

7. In a tire, the combination with a shoe of a resilient core arranged within said shoe, said core being substantially wedge shaped in cross section and contacting at its outer edge with the inner tread portion of the shoe and at its inner edge with the beads of said shoe and laterally arranged resilient spacing means contacting with the inner side portions of the shoe as set forth.

8. In a tire, the combination of a shoe, a resilient core within the shoe, said core being substantially wedge shaped in cross section and having the outer edge engaging the inner tread portion of the shoe, and resilient means connected to the base of the shoe and engaging the beveled sides of the core thereby serving to center the core within the shoe.

9. In a tire, the combination of a shoe, a resilient core within the shoe having its outer edge adapted to engage the inner tread portion of the shoe and its inner edge engaging the bead portions of the shoe with its sides spaced from the sides of the shoe, and resilient members operatively interposed between the sides of the core and the sides of the shoe, said resilient members comprising springs which are connected to the bead portions of the shoe and which extend between the sides of the core and the opposed sides of the shoe.

In testimony whereof, I hereunto affix my signature.

ROLLA B. BOSTWICK.

Copies of this patent may be obtained for five cents each, by addressing the "Commissioner of Patents, Washington, D. C."